US010847798B2

(12) United States Patent
Zhang et al.

(10) Patent No.: US 10,847,798 B2
(45) Date of Patent: Nov. 24, 2020

(54) TELLURIUM-DOPED MXENE COMPOSITE MATERIAL, AND PREPARATION METHOD AND USE THEREOF

(71) Applicant: WUYI UNIVERSITY, Guangdong (CN)

(72) Inventors: Yelong Zhang, Guangdong (CN); Hongyang Sun, Guangdong (CN); Xiaodan Xu, Guangdong (CN); Yuxuan Fan, Guangdong (CN); Da Wang, Guangdong (CN); Chi Zhang, Guangdong (CN); Weidong Song, Guangdong (CN); Mei Chen, Guangdong (CN); Jinxiu Wen, Guangdong (CN); Yue Guo, Guangdong (CN); Qingguang Zeng, Guangdong (CN); Zhangquan Peng, Guangdong (CN)

(73) Assignee: WUYI UNIVERSITY, Guangdong (CN)

( * ) Notice: Subject to any disclaimer, the term of this patent is extended or adjusted under 35 U.S.C. 154(b) by 0 days.

(21) Appl. No.: 16/527,336

(22) Filed: Jul. 31, 2019

(65) Prior Publication Data
US 2020/0227745 A1 Jul. 16, 2020

(30) Foreign Application Priority Data
Jan. 16, 2019 (CN) .......................... 2019 1 0038426

(51) Int. Cl.
*H01M 4/587* (2010.01)
*H01M 10/054* (2010.01)
*H01M 4/02* (2006.01)

(52) U.S. Cl.
CPC ......... *H01M 4/587* (2013.01); *H01M 10/054* (2013.01); *H01M 2004/028* (2013.01)

(58) Field of Classification Search
CPC .... H01L 31/0224; B01D 69/12; H01M 4/054; H01M 4/58; H01M 4/587
See application file for complete search history.

(56) References Cited

FOREIGN PATENT DOCUMENTS

CN 107200318 A * 9/2017 ........... C01B 21/082

OTHER PUBLICATIONS

Li et al., "Improved sodium-ion storage performance of Ti3C2Tx MXenes by sulfur doping", J. Mater.Chem. A, 2018, 6, pp. 1234-1243.*

* cited by examiner

*Primary Examiner* — Khanh T Nguyen
(74) *Attorney, Agent, or Firm* — McNees Wallace & Nurick LLC

(57) ABSTRACT

The present invention discloses a tellurium-doped MXene composite material and a preparation method thereof, comprising the following steps: (1) adding MXene and a tellurium source into a dispersant to prepare a dispersion, and then stirring the dispersion; (2) heating the dispersion, reacting, and then cooling; (3) centrifuging the product obtained in the step (2), then washing and drying under vacuum; and (4) placing the dry product obtained in the step (3) into a corundum ark, and then transferring into a tubular furnace, heating under the protection of inert gas, retaining the temperature, and then cooling to obtain the tellurium-doped MXene composite material. The composite material prepared by the present invention can be used as a cathode of a potassium ion battery, which increases the interlamellar spacing, and optimizes an ion diffusion channel, so that the electrochemical performance of the potassium ion battery is improved.

10 Claims, 6 Drawing Sheets

TELLURIUM-DOPED MXENE COMPOSITE MATERIAL, AND PREPARATION METHOD AND USE THEREOF

FIELD OF THE INVENTION

The present invention relates to the field of new energy technologies, and particularly relates to a preparation method of a tellurium-doped MXene composite material and a use thereof in a potassium ion battery.

BACKGROUND OF THE INVENTION

With the continuous improvement of the industrial level, energy problems have become increasingly prominent. On one hand, the traditional fossil energy storage is limited and the energy utilization rate is low. On the other hand, with the continuous improvement of people's awareness of environmental protection, the pollution caused by the traditional fossil fuels is becoming more and more unbearable. People urgently need new green energy to replace the traditional energy. Under this historical background, every country has made great efforts to develop new green energy and compete for the upland in the field of new energy technologies.

Due to their good chemical stabilities and electrochemical performances, lithium ion batteries have been the core of the field of rechargeable batteries since they were invented. However, lithium storage is limited and difficult to mine, so that the lithium is difficult to be widely used. In order to find a substitute for lithium ion batteries, potassium with similar chemical properties and larger storage capacity has begun to attract researchers' interest. It is of great scientific significance to study cathodes of potassium ion batteries with high performances.

The radius of the potassium ion is larger than that of the lithium ion, and the traditional commercial graphite electrode has a small interlamellar spacing, which cannot meet the rapid deintercalation of the potassium ion. The MXene material, as a novel two-dimensional layered material, is shaped like a "page". The MXene material has good conductivity and high specific surface area, and is suitable for being used as the cathode material of the potassium ion battery. However, the performance of the pure MXene material as the cathode material of the potassium ion battery is still unsatisfactory. Doping tellurium to MXene can increase the interlamellar spacing and optimize a potassium ion diffusion channel, thus improving the electrochemical performance of the potassium ion battery.

SUMMARY OF THE INVENTION

In view of the problems in the prior art, one object of the present invention is to provide a tellurium-doped MXene composite material. Another object of the present invention is to provide a preparation method of the tellurium-doped MXene composite material mentioned above. Further, the present invention provides an application of the tellurium-doped MXene composite material to use the tellurium-doped MXene composite material in a potassium ion battery.

The present invention employs the following technical solutions.

A preparation method of a tellurium-doped MXene composite material, comprising the following steps:

(1) adding MXene and a tellurium source into a dispersant to prepare a dispersion with a concentration of 1 mg/ml to 100 mg/ml, optionally a concentration of 20 mg/ml to 80 mg/ml, and optionally a concentration of 40 mg/ml to 60 mg/ml, then stirring the dispersion for 1 h to 5 h, and optionally for 1 h, 2 h, 3 h, 4 h and 5 h, wherein the mass ratio of MXene and the tellurium source is 1:(0.01-1), optionally 1:(0.1-0.9), optionally 1:(0.2-0.8), and optionally 1:(0.4-0.6);

(2) transferring the dispersion into a reaction kettle for sealing, then placing the reaction kettle into an oven and heating to 100° C. to 220° C., reacting for 10 h to 24 h, and then cooling to a room temperature;

(3) washing the product obtained in the step (2) with a cleaning agent, then centrifuging, and drying under vacuum; and (4) placing the dry product obtained in the step (3) into a corundum ark, and then transferring into a tubular furnace, heating to 300° C. to 500° C. under the protection of inert gas, retaining the temperature for 3 h to 5 h, and then cooling to a room temperature to obtain the tellurium-doped MXene composite material.

Further, the tellurium source is at least one selected from the group consisting of diphenyl ditelluride, sodium tellurite and tellurium powder (having a particle size of 80 to 120 meshes, for example, 100 meshes).

Further, the MXene is one or more selected from the group consisting of $Ti_3C_2T_x$, $Ti_2CT_x$, $Ti_3N_2T_x$, $V_3C_2T_x$, $V_3N_2T_x$ and $Mo_3N_2T_x$, optionally $Ti_3N_2T_x$, optionally $V_3C_2T_x$, optionally $V_3N_2T_x$, and preferably $Ti_3C_2T_x$ and $V_3C_2T_x$ with a mass ratio of 4-9:1, and optionally $Ti_3C_2T_x$, $V_3N_2T_x$ and $V_3C_2T_x$ (e.g., a mass ratio of 4-9:1:1), wherein $T_x$ is a surface functional group, such as —O, —F or —OH.

Further, a tellurium doping amount in the tellurium-doped MXene composite material is 0.5 wt % to 15 wt %, for example, 1 wt % to 13 wt %, 3 wt % to 11 wt %, 5 wt % to 12 wt %, and 6 wt % to 10 wt %.

Further, the dispersant is at least one selected from the group consisting of ethanol and N,N-dimethylformamide; and the washing agent is water and ethanol.

Further, the inert gas is Ar or $N_2$.

Further, a rotation speed used for the centrifugation in the step (3) is 4000 r/min to 6000 r/min, and preferably 5000 r/min, and the centrifugation lasts for 5 min to 10 min.

Further, a temperature of drying under vacuum in the step (3) is 50° C. to 70° C., and preferably 60° C., a drying time is 5 h to 20 h, and optionally 5 h, 6 h, 7 h, 8 h, 9 h, 10 h, 11 h, 12 h, 13 h, 14 h, 15 h, 16 h, 17 h, 18 h, 19 h and 20 h, and a vacuum degree does not exceed 135 Pa, for example, the vacuum degree does not exceed 133 Pa, 130 Pa, 120 Pa, 110 Pa, 100 Pa and 90 Pa.

There is also provided a tellurium-doped MXene composite material prepared by the preparation method of a tellurium-doped MXene composite material.

There is also provided a use of the tellurium-doped MXene composite material, wherein the tellurium-doped MXene composite material is used in a potassium ion battery.

According to the present invention, the tellurium-doped MXene material is prepared by taking a MXene nanomaterial as a matrix through a method combining hydrothermal method and heat treatment. Compared with other methods for doping elements, a tellurium element is firstly doped into the MXene by hydrothermal method, and then tellurium atoms are uniformly diffused by high-temperature annealing, and meanwhile crystal stress caused by doping is reduced. The hydrothermal method and the heat treatment are easy to operate and can be produced on a large scale. The MXene material with larger lattice distortion, more uniform defect concentration, wider interlamellar spacing and richer active sites can be obtained by combining the two methods, and has a wide application prospect in the field of energy storage devices.

The present invention has the beneficial effects:

(1) the composite material prepared by the present invention can be used as a cathode of a potassium ion battery, which increases the interlamellar spacing, and optimizes an ion diffusion channel, so that the electrochemical performance of the potassium ion battery is improved; and (2) the present invention has simple preparation process and low cost, and can be applied on a large scale.

DETAILED DESCRIPTION OF THE INVENTION

In order to better explain the present invention, the present invention will be further described with reference to the following specific embodiments, but the present invention is not limited to the specific embodiments.

Embodiment 1

A preparation method of a tellurium-doped MXene composite material, comprised the following steps:

(1) 50 mg MXene ($Ti_3C_2T_x$) and 0.5 mg diphenyl ditelluride were added into ethanol to prepare 1 mg/ml ethanol dispersion, and the ethanol dispersion was magnetically stirred for 1 h;

(2) the dispersion obtained in the step (1) was transferred to a 100 ml reaction kettle, sealed and placed in an oven at 100° C., then the temperature was retained for 10 h, and then the dispersion was naturally cooled to a room temperature;

(3) the product obtained in the step (2) was centrifuged by a centrifuge at 5000 r/min for 5 min, then washed with ultrapure water and absolute ethyl alcohol for 3 times respectively, and then transferred to a vacuum drying oven, wherein a drying temperature was 60° C., and a drying time was 5 h;

(4) the dry product obtained in the step (3) was placed into a corundum ark, and then transferred into a tubular furnace, heated to 300° C. under the protection of Ar gas at a temperature rise rate of 5° C./min, then the temperature was retained for 3 h, and the product was cooled to a room temperature to obtain the tellurium-doped MXene material; and (5) the tellurium-doped material MXene obtained in the step (4) was mixed with carbon black and a binder according to a ratio (mass ratio) of 8:1:1, uniformly coated on a current collector, and dried under vacuum and sliced as a cathode of a potassium ion battery.

Figure 1:
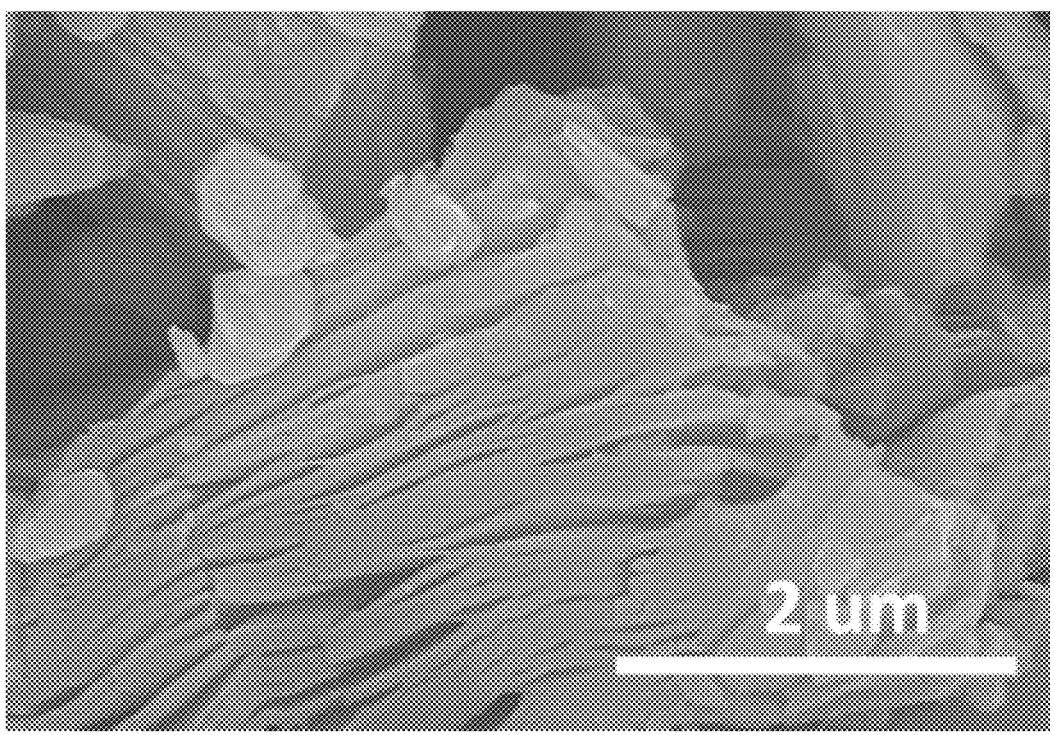
FIG. 1 is a scanning electron micrograph of an undoped MXene material in Comparative Example 1.
Figure 2:
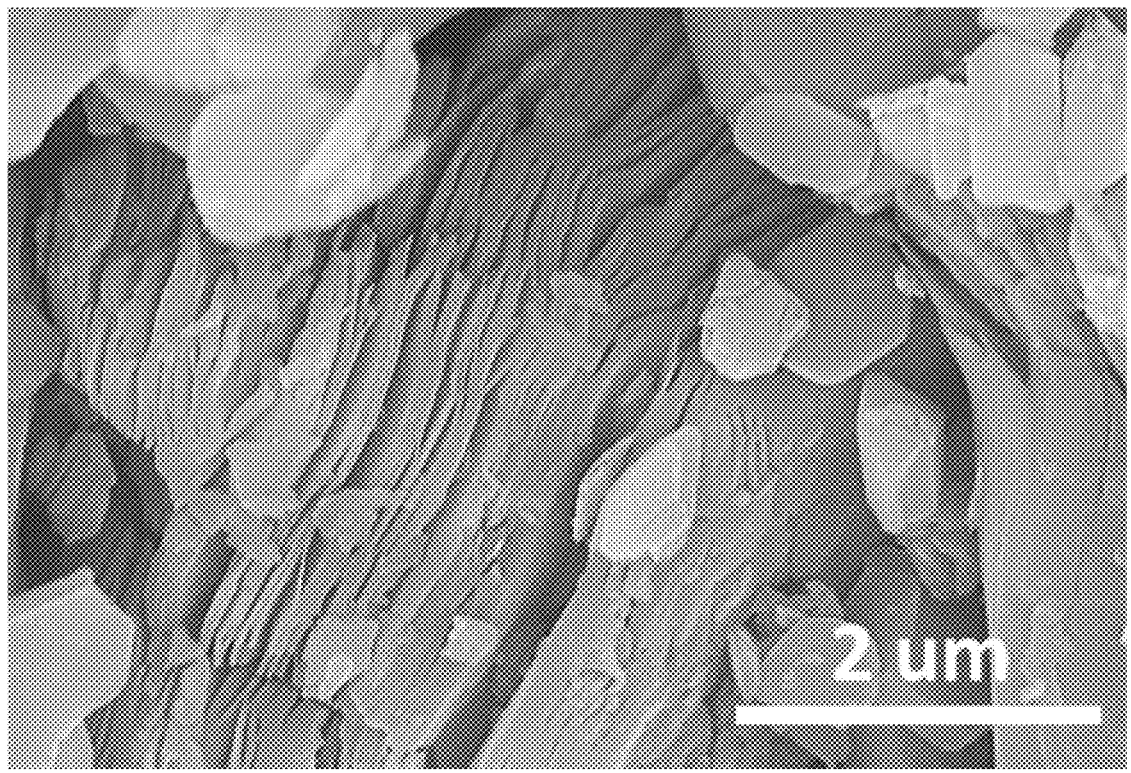
FIG. 2 is a scanning electron micrograph of a tellurium-doped MXene composite material in Embodiment 1.
Figure 3:
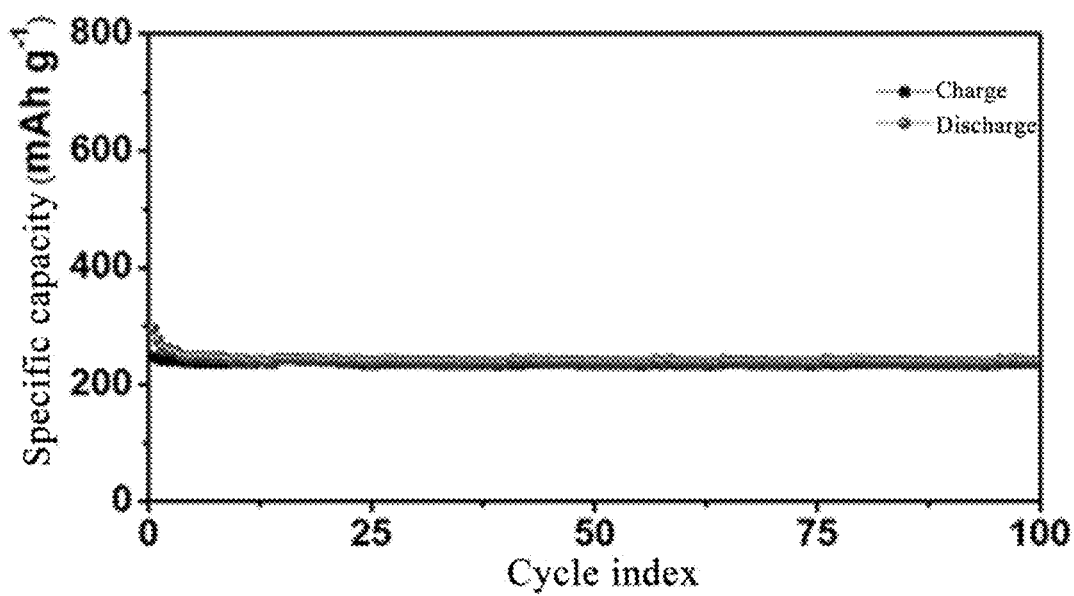
FIG. 3 is a cycle performance chart of a cathode of a tellurium-doped MXene potassium ion battery in Embodiment 1.
Figure 4:
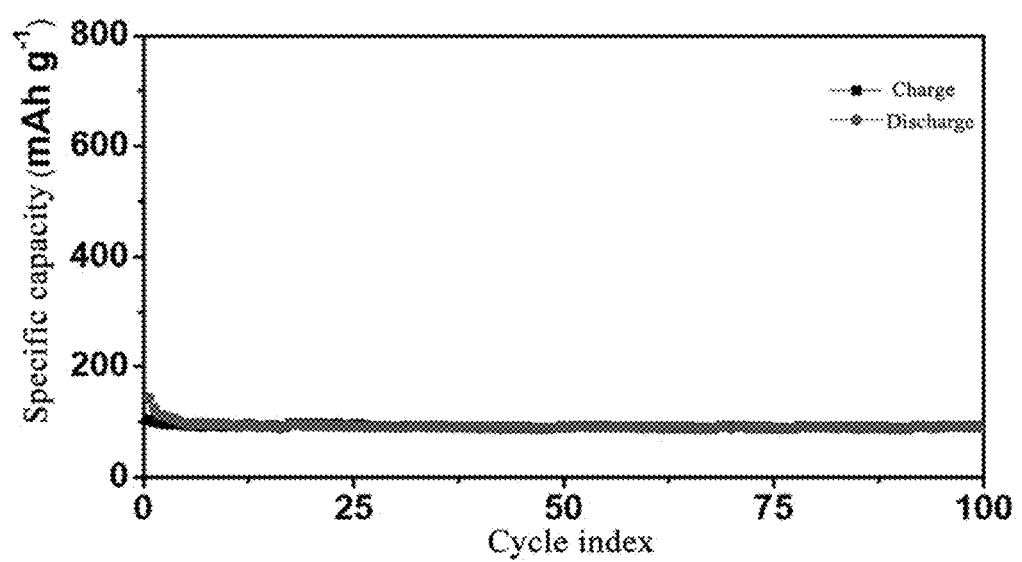
FIG. 4 is a cycle performance chart of a cathode of an undoped MXene potassium ion battery in Comparative Example 1.

The doped MXene in this embodiment had a specific surface area of 170.8 $m^2/g$, an interlamellar spacing of 0.74 nm, and a tellurium atom content of 0.2%, which were much larger than a specific surface area (38.2 $m^2/g$) and an interlamellar spacing (0.62 nm) of the undoped Mxene. At a current density of 100 mA/g, a reversible capacity of a cathode of the doped MXene potassium ion battery shown in FIG. 3 after 100 cycles was 234 mAh/g, which was 2.6 times that of a cathode of an undoped MXene potassium ion battery shown in FIG. 4 (91.7 mAh/g).

Embodiment 2

A preparation method of a tellurium-doped MXene composite material, comprised the following steps:

(1) 1000 mg MXene ($Ti_3C_2T_x$) and 500 mg diphenyl ditelluride were added into ethanol to prepare 50 mg/ml ethanol dispersion, and the ethanol dispersion was magnetically stirred for 3 h;

(2) the dispersion obtained in the step (1) was transferred to a 50 ml reaction kettle, sealed and placed in an oven at 150° C., then the temperature was retained for 15 h, and then the dispersion was cooled to a room temperature;

(3) the product obtained in the step (2) was centrifuged by a centrifuge at 5000 r/min for 5 min, then washed with ultrapure water and absolute ethyl alcohol for 3 times respectively, and then transferred to a vacuum drying oven, wherein a drying temperature was 60° C., and a drying time was 15 h;

(4) the dry product obtained in the step (3) was placed into a corundum ark, and then transferred into a tubular furnace, heated to 300° C. under the protection of Ar gas at a temperature rise rate of 5° C./min, then the temperature was retained for 3 h, and the product was cooled to a room temperature to obtain the tellurium-doped MXene material; and (5) the tellurium-doped MXene material obtained in the step (4) was mixed with carbon black and a binder according to a ratio (mass ratio) of 8:1:1, uniformly coated on a current collector, and dried under vacuum and sliced as a cathode of a potassium ion battery.

Figure 5:
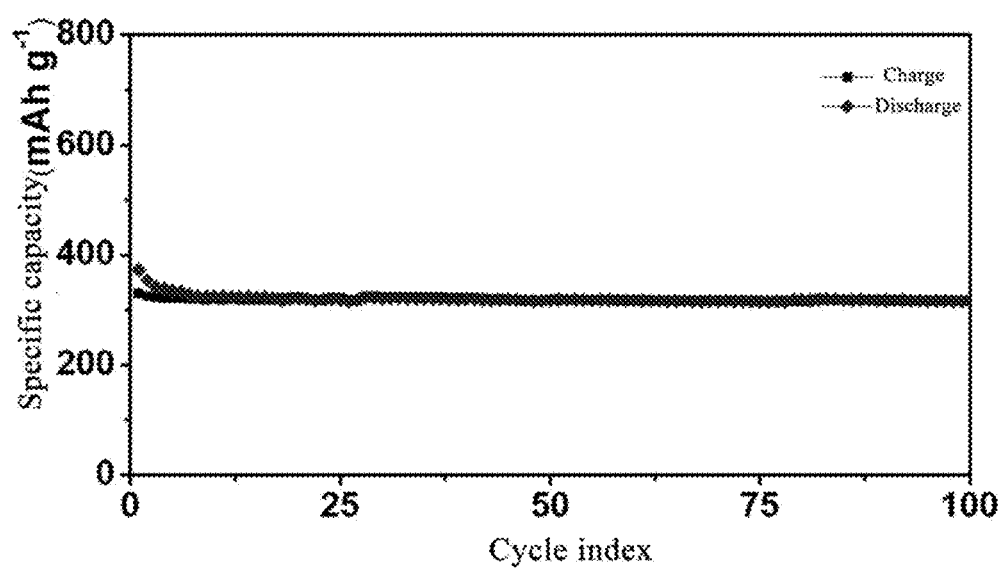
FIG. 5 is a cycle performance chart of a cathode of a tellurium-doped MXene potassium ion battery in Embodiment 2.

The doped MXene in the embodiment had a specific surface area of 300.5 $m^2/g$, an interlamellar spacing of 0.78 nm, and a tellurium atom content of 4%, which were much larger than the specific surface area (38.2 $m^2/g$) and the interlamellar spacing (0.62 nm) of the undoped Mxene. At a current density of 100 mA/g, a reversible capacity of a cathode of the doped MXene potassium ion battery shown in FIG. 5 after 100 cycles was 312 mAh/g, which was 3.4 times that of the cathode of the undoped MXene potassium ion battery (91.7 mAh/g).

Embodiment 3

A preparation method of a tellurium-doped MXene composite material, comprised the following steps:

(1) 2000 mg MXene ($Ti_3C_2T_x$) and 2000 mg sodium tellurite were added into ethanol to prepare 100 mg/ml ethanol dispersion, and the ethanol dispersion was magnetically stirred for 5 h;

(2) the dispersion obtained in the step (1) was transferred to a 50 ml reaction kettle, sealed and placed in an oven at 220° C., then the temperature was retained for 24 h, and then the dispersion was cooled to a room temperature;

(3) the product obtained in the step (2) was centrifuged by a centrifuge at 5000 r/min for 5 min, then washed with ultrapure water and absolute ethyl alcohol for 3 times respectively, and then transferred to a vacuum drying oven, wherein a drying temperature was 60° C., and a drying time was 20 h;

(4) the dry product obtained in the step (3) was placed into a corundum ark, and then transferred into a tubular furnace, heated to 300° C. under the protection of Ar gas at a temperature rise rate of 5° C./min, then the temperature was retained for 3 h, and the product was cooled to a room temperature to obtain the tellurium-doped MXene material; and (5) the tellurium-doped MXene material obtained in the step (4) was mixed with carbon black and a binder according to a ratio (mass ratio) of 8:1:1, uniformly coated on a current collector, and dried under vacuum and sliced as a cathode of a potassium ion battery.

Figure 6:
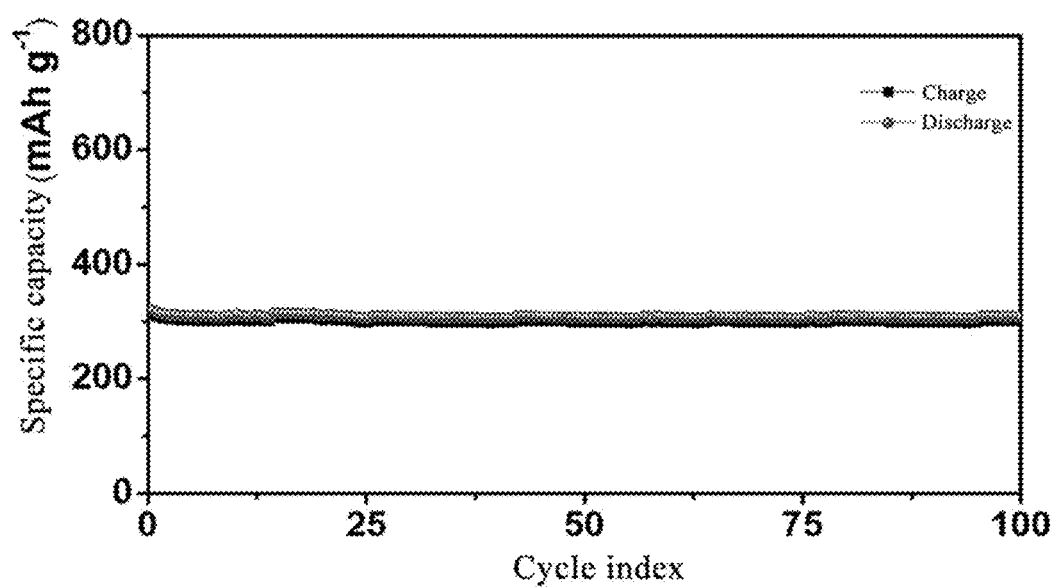
FIG. 6 is a cycle performance chart of a cathode of a tellurium-doped MXene potassium ion battery in Embodiment 3.

The doped MXene in this embodiment had a specific surface area of 254.4 m$^2$/g, an interlamellar spacing of 0.77 nm, and a tellurium atom content of 7%, which were much larger than the specific surface area (38.2 m$^2$/g) and the interlamellar spacing (0.62 nm) of the undoped MXene. At a current density of 100 mA/g, a reversible capacity of a cathode of the doped MXene potassium ion battery shown in FIG. 6 after 100 cycles was 308 mAh/g, which was 3.3 times that of the cathode of the undoped MXene potassium ion battery (91.7 mAh/g).

Embodiment 4

A preparation method of a tellurium-doped MXene composite material, comprised the following steps:

(1) 1000 mg MXene (900 mg $Ti_3C_2T_x$ and 100 mg $V_3C_2T_x$) and 500 mg diphenyl ditelluride were added into ethanol to prepare 50 mg/ml ethanol dispersion, and the ethanol dispersion was magnetically stirred for 3 h;

(2) the dispersion obtained in the step (1) was transferred to a 50 ml reaction kettle, sealed and placed in an oven at 180° C., then the temperature was retained for 16 h, and then the dispersion was cooled to a room temperature;

(3) the product obtained in the step (2) was centrifuged by a centrifuge at 5000 r/min for 5 min, then washed with ultrapure water and absolute ethyl alcohol for 3 times respectively, and then transferred to a vacuum drying oven, wherein a drying temperature was 60° C., and a drying time was 5 h;

(4) the dry product obtained in the step (3) was placed into a corundum ark, and then transferred into a tubular furnace, heated to 300° C. under the protection of Ar gas at a temperature rise rate of 4° C./min, then the temperature was retained for 3 h, and the product was cooled to a room temperature to obtain the tellurium-doped MXene material; and (5) the tellurium-doped MXene material obtained in the step (4) was mixed with carbon black and a binder according to a ratio (mass ratio) of 8:1:1, uniformly coated on a current collector, and dried under vacuum and sliced as a cathode of a potassium ion battery.

At a current density of 100 mA/g, a reversible capacity of a cathode of the doped MXene potassium ion battery in this embodiment after 100 cycles was 334 mAh/g, which was 3.6 times that of the cathode of the undoped MXene potassium ion battery (91.7 mAh/g).

Embodiment 5

(1) 1000 mg MXene ($V_3C_2T_x$) and 400 mg diphenyl ditelluride were added into ethanol to prepare 50 mg/ml ethanol dispersion, and the ethanol dispersion was magnetically stirred for 3 h;

(2) the dispersion obtained in the step (1) was transferred to a 50 ml reaction kettle, sealed and placed in an oven at 120° C., then the temperature was retained for 11 h, and then the dispersion was cooled to a room temperature;

(3) the product obtained in the step (2) was centrifuged by a centrifuge at 5000 r/min for 5 min, then washed with ultrapure water and absolute ethyl alcohol for 3 times respectively, and then transferred to a vacuum drying oven, wherein a drying temperature was 60° C., and a drying time was 6 h;

(4) the dry product obtained in the step (3) was placed into a corundum ark, and then transferred into a tubular furnace, heated to 300° C. under the protection of Ar gas at a temperature rise rate of 6° C./min, then the temperature was retained for 3 h, and the product was cooled to a room temperature to obtain the tellurium-doped MXene material; and (5) the tellurium-doped MXene material obtained in the step (4) was mixed with carbon black and a binder according to a ratio (mass ratio) of 8:1:1, uniformly coated on a current collector, and dried under vacuum and sliced as a cathode of a potassium ion battery.

At a current density of 100 mA/g, a reversible capacity of a cathode of the doped MXene potassium ion battery in this embodiment after 100 cycles is 347 mAh/g, which was 3.8 times that of the cathode of the undoped MXene potassium ion battery (91.7 mAh/g).

Comparative Example 1: a cathode of an undoped MXene potassium ion battery, wherein a process of preparing the cathode of the potassium ion battery is the same as that in the Embodiment 2.

TABLE 1

| | | Performance test | | | |
|---|---|---|---|---|---|
| | | Specific surface area (m$^2$/g) | Inter-lamellar spacing (nm) | Mass fraction of tellurium atom content (%) | Stable capacity after 100 cycles (mAh/g) |
| Comparative Example 1 | Undoped MXene | 38.2 | 0.62 | 0 | 91.7 |
| Embodiment 1 | Tellurium-doped MXene | 170.8 | 0.74 | 0.2 | 234 |
| Embodiment 2 | Tellurium-doped MXene | 300.5 | 0.78 | 4 | 312 |
| Embodiment 3 | Tellurium-doped MXene | 254.4 | 0.77 | 7 | 308 |
| Embodiment 4 | Tellurium-doped MXene | 327.1 | 0.77 | 4.3 | 334 |
| Embodiment 5 | Tellurium-doped MXene | 335.4 | 0.78 | 3.6 | 347 |

The foregoing descriptions are merely specific embodiments of the present invention, but are not intended to limit the protection scope of the present invention. All equivalent transformations made using the description of the present invention, or being used directly or indirectly in other related technical fields, are similarly included in the protection scope of the present invention.

What is claimed is:

1. A preparation method of a tellurium-doped MXene composite material, comprising the following steps:
   (1) adding MXene and a tellurium source into a dispersant to prepare a dispersion with a concentration of 1 mg/ml to 100 mg/ml, and then stirring the dispersion for 1 h to 5 h, wherein a mass ratio of MXene and the tellurium source is 1:0.01 to 1, wherein the dispersion concentration is the concentration of MXene and the tellurium source;
   (2) transferring the dispersion into a reaction kettle, then heating to 100° C. to 220° C., reacting for 10 h to 24 h, and then cooling to a room temperature;
   (3) washing the product obtained in the step (2) with a cleaning agent, then centrifuging, and drying under vacuum; and
   (4) placing the dry product obtained in the step (3) into a corundum ark, and then transferring into a tubular furnace, heating to 300° C. to 500° C. under the protection of inert gas, retaining the temperature for 3 h to 5 h, and then cooling to a room temperature to obtain the tellurium-doped MXene composite material.

2. The preparation method of a tellurium-doped MXene composite material according to claim 1, wherein the tellurium source is at least one selected from the group consisting of diphenyl ditelluride, sodium tellurite and tellurium powder.

3. The preparation method of a tellurium-doped MXene composite material according to claim 1, wherein the MXene is one or more selected from the group consisting of $Ti_3C_2T_x$, $Ti_2CT_x$, $Ti_3N_2T_x$, $V_3C_2T_x$, $V_3N_2T_x$ and $Mo_3N_2T_x$.

4. The preparation method of a tellurium-doped MXene composite material according to claim 1, wherein a tellurium doping amount in tellurium-doped MXene composite material is 0.5 wt % to 15 wt %.

5. The preparation method of a tellurium-doped MXene composite material according to claim 1, wherein the dispersant is at least one selected from the group consisting of ethanol and N,N-dimethylformamide; and the cleaning agent is water and ethanol.

6. The preparation method of a tellurium-doped MXene composite material according to claim 1, wherein the inert gas is Ar or $N_2$.

7. The preparation method of a tellurium-doped MXene composite material according to claim 1, wherein a rotation speed used for the centrifugation in the step (3) is 4000 r/min to 6000 r/min; and the centrifugation lasts for 5 min to 10 min.

8. The preparation method of a tellurium-doped MXene composite material according to claim 1, wherein a temperature of drying under vacuum in the step (3) is 50° C. to 70° C., a drying time is 5 h to 20 h, and a vacuum degree does not exceed 135 Pa.

9. A tellurium-doped MXene composite material, wherein the tellurium-doped MXene composite material is prepared by the preparation method according to claim 1.

10. A method for making a potassium ion battery comprising:
   forming the potassium ion battery, the battery comprising the tellurium-doped MXene composite material according to claim 9.

* * * * *